United States Patent
Yamada et al.

(10) Patent No.: US 12,294,053 B2
(45) Date of Patent: May 6, 2025

(54) METHOD FOR PRODUCING HIGH-PURITY AQUEOUS LITHIUM SALT SOLUTION

(71) Applicant: ASAKA RIKEN CO., LTD., Koriyama (JP)

(72) Inventors: Keita Yamada, Koriyama (JP); Yukio Sakuma, Koriyama (JP); Hiroto Inoue, Koriyama (JP)

(73) Assignee: Asaka Riken Co., Ltd., Fukushima (JP)

(*) Notice: Subject to any disclaimer, the term of this patent is extended or adjusted under 35 U.S.C. 154(b) by 301 days.

(21) Appl. No.: 17/928,436

(22) PCT Filed: Sep. 28, 2021

(86) PCT No.: PCT/JP2021/035688
§ 371 (c)(1),
(2) Date: Nov. 29, 2022

(87) PCT Pub. No.: WO2022/071335
PCT Pub. Date: Apr. 7, 2022

(65) Prior Publication Data
US 2023/0145941 A1   May 11, 2023

(30) Foreign Application Priority Data

Oct. 2, 2020   (JP) ................................ 2020-167402

(51) Int. Cl.
*H01M 10/00*     (2006.01)
*H01M 10/0563*   (2010.01)

(52) U.S. Cl.
CPC .............. *H01M 10/0563* (2013.01); *H01M 2300/0002* (2013.01)

(58) Field of Classification Search
CPC ...... H01M 10/0563; H01M 2300/0002; Y02E 60/10; C01B 25/301; C01B 25/36; C01F 7/34; Y02W 30/84
See application file for complete search history.

(56) References Cited

U.S. PATENT DOCUMENTS

| | | | |
|---|---|---|---|
| 2020/0232105 A1* | 7/2020 | Snydacker | ............... C25B 1/46 |
| 2021/0123119 A1 | 4/2021 | Oosterhof et al. | |
| 2023/0145941 A1 | 5/2023 | Yamada et al. | |

FOREIGN PATENT DOCUMENTS

| | | |
|---|---|---|
| CN | 108675323 A | 10/2018 |
| CN | 109052436 A | 12/2018 |

(Continued)

OTHER PUBLICATIONS

Office Action dated Sep. 17, 2024 issued in the corresponding Japanese Patent Application No. 2022-167488 with the English machine translation thereof.

(Continued)

*Primary Examiner* — Anca Eoff
*Assistant Examiner* — Monique M Wills
(74) *Attorney, Agent, or Firm* — Carrier, Shende & Associates P.C.; Jjoseph P. Carrier; Jeffrey T. Gedeon

(57) ABSTRACT

Provided is a method for producing a high-purity aqueous lithium salt solution, the method allowing filtering aluminum phosphate in a short time. The method for producing a high-purity aqueous lithium salt solution includes: a step of adjusting the pH of a slurry containing a mixture of lithium phosphate and aluminum hydroxide obtained from a first aqueous lithium salt solution being a raw material to a range of 2 to 3 to obtain a precipitate of aluminum phosphate; a step of filtering off and removing the precipitate of aluminum phosphate to obtain a second aqueous lithium salt solution; and a step of purifying the second aqueous lithium (Continued)

salt solution to obtain a high-purity aqueous lithium salt solution.

5 Claims, 1 Drawing Sheet

(56) References Cited

FOREIGN PATENT DOCUMENTS

| | | | |
|---|---|---|---|
| CN | 110482511 A | 11/2019 | |
| CN | 111137869 A | 5/2020 | |
| JP | 2011-020892 A | 2/2011 | |
| JP | 2019-099901 A | 6/2019 | |
| JP | 7166653 B2 | 11/2022 | |
| WO | 2018/184876 A1 | 10/2018 | |

OTHER PUBLICATIONS

Office Action dated Feb. 3, 2025 issued in the corresponding Korean Patent Application No. 10-2023-7013476 with an English translation thereof.

* cited by examiner

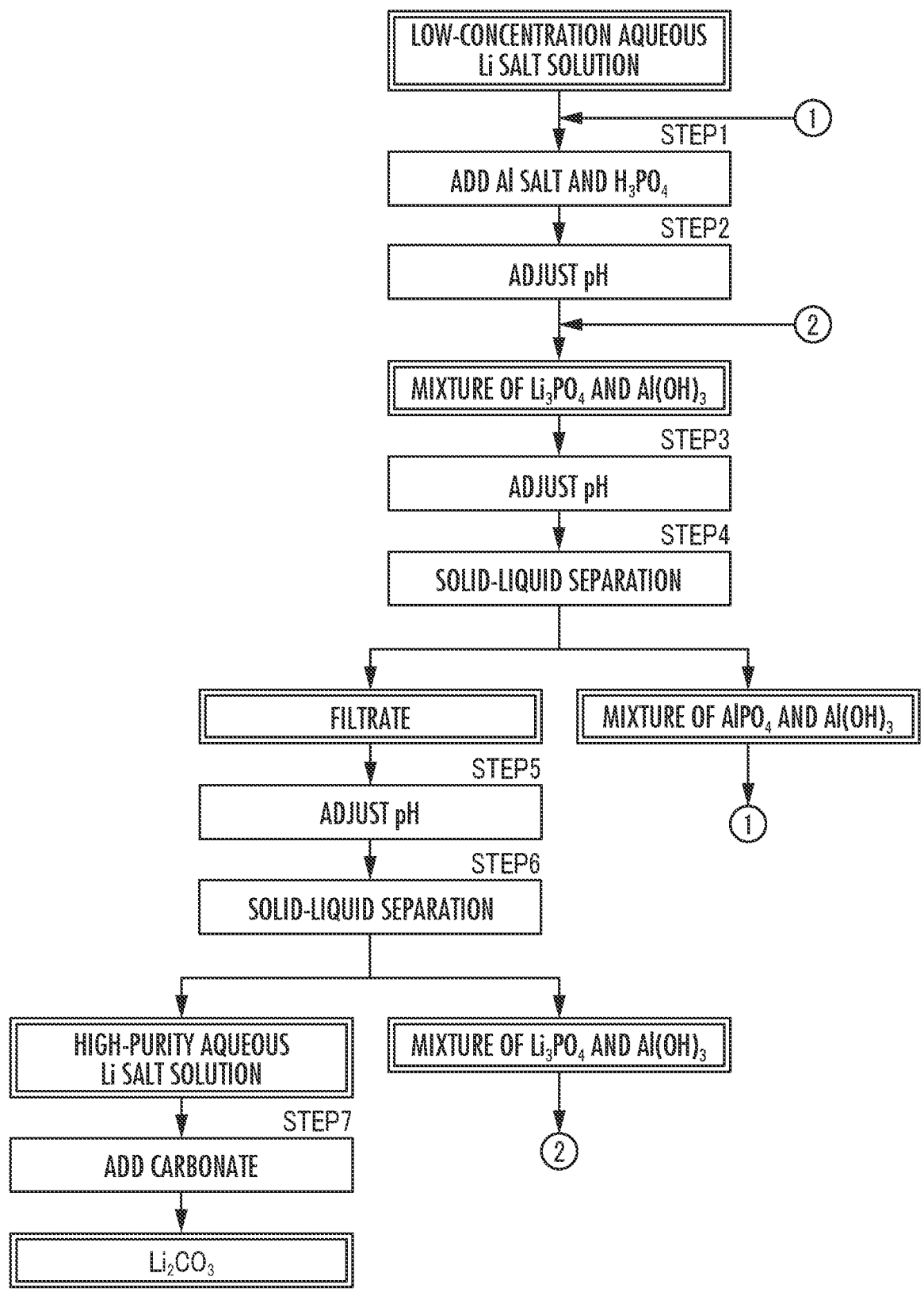

METHOD FOR PRODUCING HIGH-PURITY AQUEOUS LITHIUM SALT SOLUTION

TECHNICAL FIELD

The present invention relates to a method for producing a high-purity aqueous lithium salt solution.

BACKGROUND ART

In recent years, lithium has attracted attention as a raw material for lithium-ion batteries such as lithium-ion secondary batteries, and its supply sources include minerals, salt water, seawater, and the like, in addition to those recycled from waste lithium batteries. The salt water is obtained from natural salt lakes and contains lithium, typically in the form of lithium chloride. The concentration of lithium contained in the salt water is about 1 g/L.

Thus, the salt water obtained from a natural salt lake is supplied to an open-field evaporation pond, concentration is performed by natural evaporation over one year or more, impurities such as Mg, Ca, and B are removed, and lithium carbonate is then precipitated to be recovered. However, the method of concentrating the salt water by natural evaporation is problematic in that it takes a long time to concentrate the salt water, and it is easily affected by natural conditions such as weather, and lithium is lost by forming salts with other impurities during the concentration process.

Meanwhile, a method is known in which phosphorus, phosphoric acid, or a phosphate is added to the salt water to generate and concentrate lithium phosphate, as a method for recovering lithium carbonate from the salt water (refer to, for example, Patent Literature 1).

The method described in Patent Literature 1 is a method including adding an aluminum salt to the lithium phosphate to prepare a slurry containing the lithium phosphate and the aluminum salt, adjusting the pH of the slurry to a range of 3.8 to 4.6 to precipitate phosphate ions ($PO_4^{3-}$) and aluminum ions ($Al^{3+}$) contained in the slurry as aluminum phosphate ($AlPO_4$), and then filtering off and removing the aluminum phosphate ($AlPO_4$) to obtain a crude aqueous lithium salt solution. Patent Literature 1 describes that the crude aqueous lithium salt solution can be further purified by treatments such as pH adjustment and the use of an ion exchange membrane to remove impurities, thereby allowing a high-purity aqueous lithium salt solution to be obtained, and a carbonate such as sodium carbonate is added to the high-purity aqueous lithium salt solution to allow lithium carbonate to be obtained.

In addition, Patent Literature 1 describes four types of compounds as the aluminum salt: aluminum chloride, aluminum sulfate, aluminum potassium sulfate, and aluminum nitrate.

CITATION LIST

Patent Literature

Patent Literature 1: Chinese Patent Publication No. 108675323

SUMMARY OF INVENTION

Technical Problem

However, the method described in Patent Literature 1 is problematic in that the aluminum phosphate ($AlPO_4$), precipitated by adjusting the pH of a slurry containing lithium phosphate and aluminum salt, has problems in filterability, and the operation of filtering off the aluminum phosphate ($AlPO_4$) takes a long time.

An object of the present invention for solving the above problem is to provide a method for producing a high-purity aqueous lithium salt solution, the method allowing aluminum phosphate ($AlPO_4$) to be filtered off in a short time.

Solution to Problem

The present inventors have made intensive investigations on means for the operation of filtering off aluminum phosphate ($AlPO_4$) in a short time, and have thus found that in the method described in Patent Literature 1, aluminum phosphate ($AlPO_4$) can be filtered off in a short time by using aluminum hydroxide, which is not exemplified in Patent Literature 1, as the aluminum salt.

To solve the above problem, the method for producing a high-purity aqueous lithium salt solution according to the present invention comprises: a step of adjusting pH of a slurry containing a mixture of lithium phosphate and aluminum hydroxide obtained from a first aqueous lithium salt solution being a raw material and containing a lithium salt in a range of 0.1 to 70 g/L in terms of lithium, to a range of 2 to 3 to obtain a precipitate of aluminum phosphate; a step of filtering off and removing the precipitate of aluminum phosphate from the slurry containing the mixture of lithium phosphate and aluminum hydroxide to obtain a second aqueous lithium salt solution; and a step of purifying the second aqueous lithium salt solution to obtain a high-purity aqueous lithium salt solution.

In the method for producing a high-purity aqueous lithium salt solution according to the present invention, first, a slurry containing a mixture of lithium phosphate and aluminum hydroxide is obtained from the first aqueous lithium salt solution as a raw material. The first aqueous lithium salt solution is a low-concentration aqueous lithium salt solution that contains a lithium salt in a range of 0.1 to 70 g/L in terms of lithium. The aluminum hydroxide may be added from outside the reaction system to a slurry containing lithium phosphate obtained from the first aqueous lithium salt solution, and may be generated inside the reaction system when a slurry containing lithium phosphate is obtained from the first aqueous lithium salt solution.

In the method for producing a high-purity aqueous lithium salt solution according to the present invention, then, the pH of a slurry containing the mixture of lithium phosphate and aluminum hydroxide is adjusted to a range of 2 to 3. This generates and precipitates aluminum phosphate ($AlPO_4$) from phosphate ions and aluminum ions contained in the slurry.

Then, the precipitate of aluminum phosphate is filtered off and removed from the slurry to provide a second aqueous lithium salt solution as a filtrate. In the method for producing a high-purity aqueous lithium salt solution according to the present invention, the aluminum phosphate is generated from the slurry containing lithium phosphate and aluminum hydroxide, thereby allowing operation of filtering off the precipitate of aluminum phosphate in a short time.

In the method for producing a high-purity aqueous lithium salt solution according to the present invention, then, impurities are removed from the second aqueous lithium salt solution for purification, thereby providing a high-purity aqueous lithium salt solution.

In addition, in the method for producing a high-purity aqueous lithium salt solution according to the present invention, preferably, an aluminum salt excluding aluminum hydroxide and phosphoric acid are added to the first aqueous lithium salt solution, and pH is adjusted to a range of 8 to 14 to provide the mixture of lithium phosphate and aluminum hydroxide.

In addition, in the method for producing a high-purity aqueous lithium salt solution according to the present invention, preferably, the precipitate of aluminum phosphate filtered off from the slurry containing the mixture of lithium phosphate and aluminum hydroxide is added to the first aqueous lithium salt solution. The precipitate of aluminum phosphate acts as a source of an aluminum salt and phosphate for the first aqueous lithium salt solution. Therefore, the product obtained in the reaction system can be conveniently used as a part of an aluminum salt and phosphoric acid added to the first aqueous lithium salt solution.

In addition, in the method for producing a high-purity aqueous lithium salt solution according to the present invention, preferably, before adjusting pH of the slurry containing the mixture of lithium phosphate and aluminum hydroxide obtained from the first aqueous lithium salt solution to a range of 2 to 3, the mixture of lithium phosphate and aluminum hydroxide is filtered off from the slurry containing the mixture of lithium phosphate and aluminum hydroxide, and the mixture of lithium phosphate and aluminum hydroxide filtered off is dispersed in a smaller amount of water than the first aqueous lithium salt solution, to provide a concentrated slurry containing a mixture of lithium phosphate and aluminum hydroxide. In the method for producing a high-purity aqueous lithium salt solution according to the present invention, the mixture of the lithium phosphate and aluminum hydroxide is concentrated, thereby allowing operation of filtering off the slurry or the precipitate of the aluminum phosphate in a shorter time.

In addition, in the method for producing a high-purity aqueous lithium salt solution according to the present invention, the second aqueous lithium salt solution is preferably purified by adjusting pH of the second aqueous lithium salt solution to a range of 7 to 10, and filtering off the resulting precipitates of lithium phosphate and aluminum hydroxide. This can remove phosphate ions and aluminum ions as impurities contained in the second aqueous lithium salt solution.

In addition, in the method for producing a high-purity aqueous lithium salt solution according to the present invention, the precipitates of lithium phosphate and aluminum hydroxide filtered off from the second aqueous lithium salt solution are preferably added to the mixture of lithium phosphate and aluminum hydroxide obtained from the first aqueous lithium salt solution. The precipitates of lithium phosphate and aluminum hydroxide filtered off from the second aqueous lithium salt solution contain lithium phosphate, and therefore adding the precipitates to the mixture of lithium phosphate and aluminum hydroxide obtained from the first aqueous lithium salt solution can improve the rate of recovery of lithium.

BRIEF DESCRIPTION OF THE DRAWING

FIG. 1 is a flowchart showing the method for producing a high-purity aqueous lithium salt solution according to the present invention.

DESCRIPTION OF EMBODIMENTS

Hereinafter, embodiments of the present invention will be described in more detail with reference to the accompanying drawings.

As shown in FIG. 1, in the method for producing a high-purity aqueous lithium salt solution of the present embodiment, first, in STEP 1 of FIG. 1, an aluminum (Al) salt and phosphoric acid ($H_3PO_4$) are added to a low-concentration aqueous lithium (Li) salt solution as the first aqueous lithium salt solution. The low-concentration aqueous Li salt solution includes a lithium salt such as lithium chloride in a range of 0.1 to 70 g/L in terms of lithium. As such a low-concentration aqueous Li salt solution, for example, salt water obtained from a natural salt lake can be used. The Al salt added to the low-concentration aqueous Li salt solution may be any Al salt other than aluminum hydroxide, and for example, aluminum chloride can be used.

Then, in STEP 2, the pH of the low-concentration aqueous Li salt solution to which Al salt and $H_3PO_4$ are added is adjusted to a range of 8 to 14, preferably a range of 10 to 11. The pH adjustment in STEP 2 can be performed by adding, for example, sodium hydroxide (NaOH) or its aqueous solution to the low-concentration aqueous Li salt solution to which Al salt and $H_3PO_4$ are added.

This generates lithium phosphate ($Li_3PO_4$) and aluminum hydroxide ($Al(OH)_3$) in the low-concentration aqueous Li salt solution to which Al salt and $H_3PO_4$ are added, and a slurry containing a mixture of $Li_3PO_4$ and $Al(OH)_3$ can be obtained.

Then, in STEP 3, the pH of the slurry is adjusted to a range of 2 to 3. The pH adjustment in STEP 2 can be performed by adding, for example, hydrochloric acid or sulfuric acid. This generates and precipitates aluminum phosphate ($AlPO_4$) from $Li_3PO_4$ and $Al(OH)_3$.

Then, in STEP 4, the $AlPO_4$ is filtered off and removed for solid-liquid separation from the slurry, thereby allowing providing a filtrate as the second aqueous lithium salt solution. In this case, the $AlPO_4$ is generated from the slurry and thus includes a trace amount of unreacted $Al(OH)_3$. As a result, it is presumed that the filterability of the $AlPO_4$ is improved, and the operation of filtering off can be performed in a short time.

In the method for producing a high-purity aqueous lithium salt solution according to the present embodiment, the slurry containing the mixture of $Li_3PO_4$ and $Al(OH)_3$ obtained in STEP 2 may be concentrated by filtering off $Li_3PO_4$ and $Al(OH)_3$ for solid-liquid separation and redispersing them in a smaller amount of water than the low-concentration aqueous Li salt solution before adjusting the pH of the slurry to a range of 2 to 3 in STEP 3. Concentrating the slurry allows the operation of filtering off the $AlPO_4$ from the slurry in STEP 4 in a shorter time.

The filtrate obtained in STEP 4 is a lithium chloride aqueous solution when the pH is adjusted by adding hydrochloric acid in STEP 3, and is a lithium sulfate aqueous solution when the pH is adjusted by adding sulfuric acid in STEP 3. In addition, the $AlPO_4$ containing a trace amount of $Al(OH)_3$ separated in STEP 4 (mixture of $AlPO_4$ and $Al(OH)_3$) can be returned to STEP 1.

Then, in STEP 5, the pH of the filtrate obtained in STEP 4 is adjusted to a range of 7 to 10. The above pH adjustment in STEP 5 can be performed, for example, by adding sodium hydroxide (NaOH) or its aqueous solution. This precipitates phosphate and aluminum ions that are impurities contained in the filtrate as $Li_3PO_4$ and $Al(OH)_3$.

Then, in STEP 6, $Li_3PO_4$ and $Al(OH)_3$ are filtered off and removed from the filtrate for solid-liquid separation, thereby allowing providing a high-purity aqueous lithium salt solution with reduced concentrations of phosphorus and aluminum as the impurities. $Li_3PO_4$ and $Al(OH)_3$ filtered off in STEP 6 contain lithium, and thus adding them to the slurry containing a mixture of $Li_3PO_4$ and $Al(OH)_3$ obtained in STEP 2 can improve the rate of recovery of lithium.

Addition of a carbonate such as sodium carbonate in STEP 7 to the high-purity aqueous lithium salt solution obtained in the present embodiment can afford lithium carbonate.

Examples and Comparative Examples of the present invention will be shown.

EXAMPLES

Example 1

In the present Example, first, 27.5 g of lithium chloride was added to 1.5 L of ion-exchanged water to prepare a low-concentration aqueous lithium solution containing 3 g/L of lithium (Li) as the first aqueous lithium salt solution.

Then, in STEP 1 shown in FIG. 1, 54.8 g of aluminum chloride hexahydrate and 26.2 g of 85% phosphoric acid were added to the low-concentration aqueous lithium solution, and the liquid temperature was maintained at 60° C. and stirring was performed.

Then, in STEP 2 shown in FIG. 1, 111.2 g of 48% sodium hydroxide aqueous solution was added to the low-concentration aqueous lithium solution to which aluminum chloride hexahydrate and phosphoric acid had been added, and reaction occurred for 120 minutes and the pH was adjusted to 10. As a result, a first slurry containing a mixture of lithium phosphate ($Li_3PO_4$) and aluminum hydroxide ($Al(OH)_3$) was obtained.

Then, the first slurry was subjected to solid-liquid separation by filtration under reduced pressure with a vacuum pump. Specifically, a Buchner funnel with a filter paper diameter of 95 mm (manufactured by Kiriyama Seisakusho Co., Ltd.) and a suction bottle were used, and No. 3 filter paper with a retention particle size of 0.5 μm (manufactured by Kiriyama Seisakusho Co., Ltd.) was used as a filter paper. The precipitate filtered off was washed with 300 mL of ion-exchanged water to obtain 281 g of a hydrous precipitate containing a mixture of lithium phosphate and aluminum hydroxide. The time required for the solid-liquid separation was 3 minutes and 50 seconds.

Then, 100 mL of an aqueous lithium solution containing 20 g/L of lithium was added to 131 g of the hydrous precipitate and redispersion was performed by stirring to obtain a concentrated second slurry containing a mixture of lithium phosphate and aluminum hydroxide. The hydrous precipitate of 131 g contained 11 g of lithium phosphate and 8 g of aluminum hydroxide. In the present Example, the concentration of each element was analyzed by using an ICP emission spectrometer (manufactured by PerkinElmer Japan Co., Ltd.).

Then, in STEP 3 shown in FIG. 1, the liquid temperature of the second slurry was maintained at 60° C., 29.1 g of 36% hydrochloric acid was added, and the mixture was allowed to stand for one hour to adjust the pH to 2.5. As a result, a third slurry containing a mixture of aluminum phosphate ($AlPO_4$) and aluminum hydroxide ($Al(OH)_3$) was obtained.

Then, in STEP 4 shown in FIG. 1, the third slurry was subjected to solid-liquid separation by filtration under reduced pressure with a vacuum pump. Specifically, a Buchner funnel with a filter paper diameter of 60 mm (manufactured by Kiriyama Seisakusho Co., Ltd.) and a suction bottle were used, and No. 3 filter paper with a retention particle size of 0.5 μm (manufactured by Kiriyama Seisakusho Co., Ltd.) was used as a filter paper. The precipitate filtered off was washed with 60 mL of ion-exchanged water to obtain 68 g of a hydrous precipitate containing a mixture of aluminum phosphate and aluminum hydroxide and 200 mL of a filtrate as the second aqueous lithium salt solution. It took 6 minutes and 5 seconds for the solid-liquid separation to filter off the hydrous precipitate containing a mixture of the aluminum phosphate and aluminum hydroxide from the third slurry.

The filtrate contained 18 g/L of lithium, 0.3 g/L of phosphorus (P), and less than 20 mg/L of aluminum (Al).

Then, in STEP 5 shown in FIG. 1, the liquid temperature of the filtrate was maintained at 60° C., and 0.1 g of a 48% sodium hydroxide aqueous solution was added to adjust the pH to 7.9. Stirring for 30 minutes yielded a precipitate containing a mixture of lithium phosphate and aluminum hydroxide.

Then, in STEP 6 shown in FIG. 1, filtering off of the precipitate provided a high-purity aqueous lithium salt solution containing 17.6 g/L of lithium and having a phosphorus and aluminum concentration of less than 1 mg/L.

Example 2

In the present Example, a high-purity aqueous lithium salt solution was obtained in exactly the same manner as in Example 1, except that 17.9 g of 36% hydrochloric acid was added to the concentrated second slurry containing the mixture of lithium phosphate and aluminum hydroxide to adjust the pH to 4.3 in STEP 3 shown in FIG. 1.

In the present Example, it took 5 minutes and 28 seconds for the solid-liquid separation to filter off the hydrous precipitate containing a mixture of the aluminum phosphate and aluminum hydroxide from the third slurry, in STEP 4 shown in FIG. 1.

Comparative Example 1

In the present Comparative Example, 11 g of trilithium phosphate ($Li_3PO_4$) and 24.6 g of aluminum chloride hexahydrate were added to 112 g of ion-exchanged water, and 9 g of 61% nitric acid was further added to provide a fourth slurry containing a mixture of lithium phosphate and aluminum chloride ($AlCl_3$). The fourth slurry obtained in the present Comparative Example was a slurry corresponding to the second slurry in Example 1.

Then, in STEP 3 shown in FIG. 1, the liquid temperature of the fourth slurry obtained in the present Comparative Example was maintained at 60° C., 11.6 g of 48% sodium hydroxide aqueous solution was added, and the mixture was stirred for one hour to adjust the pH to 4.3. As a result, a fifth slurry containing aluminum phosphate ($AlPO_4$) was obtained.

Then, in STEP 4 shown in FIG. 1, the fifth slurry was subjected to solid-liquid separation in exactly the same manner as the third slurry in Example 1, thereby providing 90.9 g of a hydrous precipitate containing aluminum phosphate and 200 mL of a filtrate as the second aqueous lithium salt solution.

In the present Comparative Example, it took 1 hour and 24 minutes for the solid-liquid separation to filter off the hydrous precipitate containing the aluminum phosphate from the fifth slurry, in STEP 4 shown in FIG. 1. In addition, the filtrate contained 14.5 g/L of lithium, 30 mg/L of phosphorus, and less than 1 mg/L of aluminum.

Comparative Example 2

In the present Comparative Example, 11 g of trilithium phosphate ($Li_3PO_4$) and 38.2 g of aluminum nitrate nonahydrate were added to 95 g of ion-exchanged water, and 9 g of 61% nitric acid was further added to provide a fourth slurry containing a mixture of lithium phosphate and aluminum chloride ($AlCl_3$).

Then, in STEP 3 shown in FIG. 1, the liquid temperature of the fourth slurry obtained in the present Comparative Example was maintained at 60° C., 8.8 g of 48% sodium hydroxide aqueous solution was added, and the mixture was stirred for one hour to adjust the pH to 2.5. As a result, a fifth slurry containing aluminum phosphate ($AlPO_4$) was obtained.

Then, in STEP 4 shown in FIG. 1, the fifth slurry was subjected to solid-liquid separation in exactly the same manner as the third slurry in Example 1, thereby providing 68 g of a hydrous precipitate containing aluminum phosphate and 215 mL of a filtrate as the second aqueous lithium salt solution.

In the present Comparative Example, it took 4 hours and 3 minutes for the solid-liquid separation to filter off the hydrous precipitate containing the aluminum phosphate from the fifth slurry, in STEP 4 shown in FIG. 1. In addition, the filtrate contained 16.2 g/L of lithium, 100 mg/L of phosphorus, and 200 mg/L of aluminum.

As described above, it is clear that the method for producing a high-purity aqueous lithium salt solution in Example 1 and Example 2 using aluminum hydroxide to obtain the precipitate of aluminum phosphate allows the operation of filtering off the precipitate of aluminum phosphate in a shorter time, as compared with Comparative Example 1 using aluminum chloride and Comparative Example 2 using aluminum nitrate instead of the aluminum hydroxide.

REFERENCE SIGNS LIST

None.

The invention claimed is:

1. A method for producing an aqueous lithium salt solution, comprising:
   a step of adjusting pH of a slurry, wherein the slurry contains a mixture of lithium phosphate and aluminum hydroxide obtained from a first aqueous lithium salt solution being a raw material and containing a lithium salt in a range of 0.1 to 70 g/L in terms of lithium, to a range of 2 to 3 to obtain a precipitate of aluminum phosphate;
   a step of filtering off and removing the precipitate of aluminum phosphate from the slurry containing the mixture of lithium phosphate and aluminum hydroxide to obtain a second aqueous lithium salt solution; and
   a step of purifying the second aqueous lithium salt solution to obtain the aqueous lithium salt solution by adjusting pH of the second aqueous lithium salt solution to a range of 7 to 10, and filtering off resulting precipitates of lithium phosphate and aluminum hydroxide.

2. The method for producing an aqueous lithium salt solution according to claim 1, wherein an aluminum salt excluding aluminum hydroxide and phosphoric acid are added to the first aqueous lithium salt solution, and pH of the first aqueous lithium salt solution is adjusted to a range of 8 to 14 to provide the mixture of lithium phosphate and aluminum hydroxide.

3. The method for producing an aqueous lithium salt solution according to claim 2, wherein the precipitate of aluminum phosphate filtered off from the slurry containing the mixture of lithium phosphate and aluminum hydroxide is added to the first aqueous lithium salt solution.

4. The method for producing an aqueous lithium salt solution according to claim 1, wherein before adjusting pH of the slurry containing the mixture of lithium phosphate and aluminum hydroxide obtained from the first aqueous lithium salt solution to a range of 2 to 3, the mixture of lithium phosphate and aluminum hydroxide is filtered off from the slurry containing the mixture of lithium phosphate and aluminum hydroxide, and the mixture of lithium phosphate and aluminum hydroxide filtered off is dispersed in a smaller amount of water than the first aqueous lithium salt solution, to provide a concentrated slurry containing a mixture of lithium phosphate and aluminum hydroxide.

5. The method for producing an aqueous lithium salt solution according to claim 1, wherein the precipitates of lithium phosphate and aluminum hydroxide filtered off from the second aqueous lithium salt solution are added to the mixture of lithium phosphate and aluminum hydroxide obtained from the first aqueous lithium salt solution.

\* \* \* \* \*